Patented Apr. 25, 1939

2,156,242

UNITED STATES PATENT OFFICE 2,156,242

ERGOT DERIVATIVE AND PROCESS OF OBTAINING IT

Morris S. Kharasch and Romeo Ralph Legault, Chicago, Ill., assignors to Eli Lilly and Company, Indianapolis, Ind., a corporation of Indiana No Drawing. Application May 9, 1935, Serial No. 20,628

12 Claims. (Cl. 206—236)

Our invention relates to a hitherto unknown active principle of ergot, and to the process of obtaining it.

Six alkaloids of ergot have previously been reported in more or less pure form. These are:

1. Ergotoxine.
2. Ergotinine.
3. Ergotamine.
4. Ergotaminine.
5. Ergoclavin.
6. Sensibamine.

These six alkaloids of ergot will be referred to herein as the "known ergot alkaloids".

Of these six, the first, third, fifth, and sixth are claimed to possess oxytocic activity when tested by the commonly used methods of testing for ergot potency—namely, (1) the cockscomb method of the U. S. Pharmacopoeia, (2) the abilition of the motor action of epinephrine on the isolated uterus of the rabbit, commonly known as the method of Broom & Clark, and (3) the M. I. Smith colorimetric method. The second and fourth possess little or no oxytocic activity when tested by the first and second methods, although they still give the colorimetric test.

On administration of these "known ergot alkaloids", in sufficient quantity to produce oxytocic effects in human mothers, however, certain undesirable side effects are almost uniformly produced, such as an increase in blood pressure and/or an undesirable effect on the heart and/or the production of nausea and vomiting.

In addition, when these "known ergot alkaloids", even in substantially pure form, are tested by the bag test in situ in the postpartum human uterus, it is found that orally administered doses which are sufficiently small to be safe, such for instance as of the order of 2 or 3 mg., in general have little or no effect in inducing uterine contractions, or in showing any appreciable oxytocic effect.

Yet if fresh water-extracts or alcohol-extracts of ergot are similarly administered orally to human mothers who are being subjected to the bag test, in doses derived from the same amount of original ergot as were the doses of "known ergot alkaloids" referred to in the preceding paragraph, it is found that such water-extracts or alcohol-extracts will produce definite uterine contractions.

From a study of all this, we concluded that a heretofore unknown active principle, active on oral administration, is present in some form in ergot, probably as a complex salt, and also in fresh water-extracts and alcohol-extracts of ergot. This heretofore unknown active principle of ergot has hitherto been unwittingly thrown away in the débris incidental to the isolation of the "known ergot alkaloids".

It is the object of this present invention to obtain that "orally active principle" in and of itself, substantially separate from the "known ergot alkaloids" as well as from the many other things which are co-present with it in ergot, in water-extracts, alcohol-extracts, and some other extracts of ergot.

We have given the name of "ergotocin" to that orally active principle, which we have obtained in pure form.

We have obtained ergotocin in a very pure crystalline form, although absolute purity is not essential to our invention. We have worked out a general process by which ergotocin may be consistently obtained from any ergot which contains it (the Spanish ergot usually contains it), and our present application is directed to both the product and the process.

Although ergotocin is undoubtedly present in some form in fresh water-extracts and alcohol-extracts of ergot, our product is very different from such extracts. Our ergotocin is fairly stable, and in the form of certain salts is very stable, both in regard to time and temperature; is free or substantially free from injurious or disagreeable substances; has substantially no taste in therapeutic doses, so that it is very easy to take; produces little or no intestinal disturbance on either oral or hypodermic administration; and can be administered in doses of which the effect is quite closely predeterminable.

In these characteristics ergotocin is widely different from the fluid extracts of ergot; which deteriorate with time and upon heating, contain much injurious and disagreeable material, have a decidedly disagreeable taste so that they are very hard to take, usually cause great intestinal upsets, and are uncertain in their effect even from day to day.

In obtaining ergotocin, we fundamentally make use of a tremendously greater solubility which we have discovered that ergotocin and its salts have in comparison to the "known ergot alkaloids", in all of a large number of solvents which we have tried. Using that differential solubility, we proceed in general as follows:

Step 1

We first produce or obtain an ergot extract, either solid or liquid, which is relatively rich in the desired ergotocin, although it contains at least some of the "known ergot alkaloids" of the original ergot, but which desirably has only a relatively small amount of the débris which the original ergot contained.

Step 2

We next treat said ergot extract to obtain the ergotocin in solution while by reason of this aforesaid differential solubility the "known ergot alkaloids" (and a greater or less amount of the co-present débris) are at least in large measure excluded from such solution—which may be by keeping them from going into the solution if the solution is formed from a solid extract of ergot, or by throwing them out of solution if they are already in solution. This may be done in a number of ways including the following:

a. Adding a precipitant, which reacts with the "known ergot alkaloids" to form relatively insoluble compounds thereof.

b. Adding a salting-out reagent, which causes known ergot alkaloids to be thrown out of solution while the ergotocin remains in solution.

c. Adding a reagent which causes a precipitation of the "known ergot alkaloids" in the form of the free bases, while the ergotocin remains in solution.

All of these variants have just been described as throwing the "known ergot alkaloids" out of solution; but by obvious modification they may be used in connection with forming a solution of ergotocin from the solid extract of ergot; as by:

a. Extracting a solid extract of ergot with a solvent which contains a precipitant such as referred to.

b. Extracting a solid extract of ergot with a solvent already containing the salting-out reagent.

c. Extracting a solid extract of ergot with a solvent which causes the "known ergot alkaloids" to remain in solid form, in the form of free bases.

In any of these variants, a solution of ergotocin is obtained, co-present with a precipitate or residue containing most of the originally co-present "known ergot alkaloids" and more or less miscellaneous extraneous material and debris. Such solution of ergotocin is suitably separated from the solid matter, as by filtration.

*Step 3*

The crude solution of ergotocin thus obtained may be used as such. Or, if desired, it may be further purified; as by using a different variant of the second step from the one that was first used. In addition, if the second step did not in itself include the making alkaline of the solution containing ergotocin, that solution is now adjusted to a hydrogen ion concentration of between pH 6.2 and pH 8.2, as by the addition of sodium carbonate or bicarbonate.

*Step 4*

There is now added to such aqueous ergotocin-containing solution, which is advantageously rather a dilute solution, a solvent in which the ergotocin is more soluble than it is in water; and the whole well shaken. Such solvent must be immiscible with water or at least with salt water; and in the latter case, and advantageously in any case, the aqueous solution has a salting-out reagent added to it (such as $Na_2SO_4$, NaCl, $(NH_4)_2SO_4$, etc.), because ergotocin is less soluble in salt water than in fresh water. Among the solvents which may be used are chloroform, butyl alcohol, isopropyl alcohol, cyclohexanol, methylnaphthalene, etc. This extracts ergotocin from the aqueous solution, while leaving behind the greater part of any co-present contaminating substances.

To facilitate this extraction, if chloroform is used, it is convenient for rapidity and completeness of extraction to add an alcohol, most conveniently ethyl alcohol or methyl alcohol, although alcohols which are immiscible with water, such for instance as cyclohexanol, may be used. Such an alcohol may be added in an amount of from about 5% to about 20% of the chloroform used.

*Step 5*

The free base ergotocin may be obtained in solid form from the chloroform solution by evaporation of the chloroform in vacuo.

Instead of thus obtaining the free base ergotocin, the ergotocin may be precipitated in the form of a salt, by adding an ether solution of a suitable acid to the chloroform solution; and we find that the most advantageous procedure. Maleic acid is highly suitable for this purpose; although other aliphatic dicarboxylic acids having not more than five carbon atoms in a straight chain may be used, such for instance as tartaric acid, oxalic acid, malic acid, malonic acid, and fumaric acid, as may also phosphoric acid among the inorganic acids.

More in detail these five steps are as follows:

*Step 1*

Among the initial ergot extracts which are relatively rich in the desired ergotocin, although they also contain at least some of the "known ergot alkaloids" of the original ergot, but which have only a relatively small amount of the débris which the original ergot contained, may be mentioned:

a. The solid extract obtainable by extraction of defatted ergot with liquid sulphur dioxide and evaporation of the solvent, as set forth in our co-pending application Serial No. 716,158, filed March 17, 1934, now Patent No. 2,082,342, granted June 1, 1937.

b. The solid extract obtained by extraction of ergot with liquid ammonia and evaporation of the solvent, as set forth in U. S. Patent No. 2,067,866, granted January 12, 1937, to Elmer H. Stuart, on application Serial No. 111,487, filed November 19, 1936, which application was a continuation in part of the co-pending application of said Elmer H. Stuart, Serial No. 617,070, filed June 13, 1932.

c. The liquid extract obtained by extracting the defatted ergot with lower aliphatic alcohols, containing not more than six carbon atoms, either straight-chain or branched-chain, or certain cyclic alcohols such as cyclopentanol and cyclohexanol. These extracting solvents may be used as such, or with water when miscible therewith.

We prefer the sulphur-dioxide extract mentioned under a, as it contains so little débris that its weight is of the order of from 1.5% to 3%, usually about 2%, of the weight of the original ergot. The liquid-ammonia extract and the alcohol extract contain much more débris, for their weights are usually of the order of 8% to 17% of the weight of the original ergot.

Other extracting solvents may be used, and have been used by us, for the initial extraction of ergot; such as acetone, chloroform, tri-chlorethylene, ethylenedichloride, methylnaphthalene, water, or acidulated water; although in our experience none of them has proven as satisfactory as liquid sulfur dioxide.

*Step 2*

Irrespective of the method of obtaining the initial liquid extract of defatted ergot, it is often desirable, and with some solvents essential, to evaporate the solvent and thereby obtain a solid extract.

Having obtained an ergot extract which is relatively rich in ergotocin, advantageously the sulfur-dioxide extract, our next step is to separate the ergotocin from whatever amount there may be in the extract of the six "known ergot alkaloids", as well as from much of the co-present extraneous matter; for in all the extracts above named there will be a greater or less amount of some of the "known ergot alkaloids" in addition to ergotocin, and considerable extraneous matter.

a. To obtain this separation, we make use of the differential precipitant reagent which enables us to separate ergotocin from the "known ergot alkaloids". That is, we have found that in certain dilutions the known ergot alkaloids may be precipitated almost quantitatively by the addition of small amounts of any of a number of reagents, while the ergotocin remains in solution. With one exception (Mayers' reagent) we believe, the precipitating action of these reagents for the "known ergot alkaloids" has not previously been known; and without exception their differential action in precipitating the "known ergot alkaloids" while at the same concentration leaving ergotocin in solution is entirely new with us.

In other words, we have discovered a new selective precipitating action, by which we can obtain ergotocin substantially free from the "known ergot alkaloids"; and it is this selective precipitating action which first made it possible to obtain ergotocin.

Among these selective precipitants, which usually work best at about pH 4, are these general classes.

1. Aromatic organic mono-sulfonic acids of high molecular weight, or their alkali-metal salts, such as their sodium salts, including:

a. Anthraquinone sulfonic acids; such as anthraquinone-2-sulfonic acid (or its sodium salt—commonly known as silver salt—), which is very good; or anthraquinone-1-sulfonic acid (or its sodium salt), which is fairly good. Thus the sodium salt of anthraquinone-2-sulfonic acid will precipitate ergotamine or ergotoxin from solutions containing as little as 1:10,000, but will not precipitate ergotocin in a dilution of 1:400; which thus allows an extremely convenient separation of these materials.

b. Anthracene sulfonic acids, or their sodium salts.

c. Various chloro- and nitro-substituted naphthalene, anthracene, and anthraquinone mono-sulfonic acids, or their sodium salts.

2. Complexes of certain metals, which are known precipitants of alkaloids. Chief among these is:

a. Mayers' reagent, which is a complex of potassium iodide and mercuric iodide, presumably $K_2HgI_4$. This precipitates the "known ergot alkaloids" in exceedingly high dilution; for instance, 1:1,000,000. But it will not precipitate ergotocin save in relatively much greater concentration, as of the order of 1:6000. This is another illustration of that phase of our discovery involving the tremendously greater solubility of ergotocin over that of the "known ergot alkaloids".

3. Certain other complexes, such for instance as:

a. Reinecke's salt, which is $$NH_4Cr(NH_3)_2(SCN)_4$$

b. Phosphotungstic acid.
   c. Phosphomolybdic acid.

4. Potassium ferrocyanide or ferricyanide.

A partial list of these selective precipitants, in the approximate order of their efficacy as selective precipitants, is as follows:

1. Anthraquinone-2-sulfonic acid, and its sodium salt—commonly called silver salt.
2. β-Naphthylamine-3,6-disulfonic acid, and its sodium salt—commonly known as amino-R-salt.
3. β-Naphthol-6,8-disulfonic acid, and its sodium salt—commonly known as G salt.
4. Nevile & Winter's acid, which is 1-naphthol-4-sulfonic acid, and its sodium salt.
5. Ethyl mercury thio-phenyl p-sulfonic acid, which is

and its sodium salt.

6. The di-sodium salt of amino-G acid, which is 2-amino naphthalene-6,8-disulfonic acid.
7. Anthraquinone-1-sulfonic acid, and its sodium salt.
8. Anthraquinone-1,5-disulfonic acid, and its sodium salt.
9. p-Sulfhydryl-phenyl-sulfonic acid, and its sodium salt.

Many other selective precipitants can undoubtedly be found. Fundamentally they are in a class which produce in a solution conditions which precipitate the "known ergot alkaloids" while leaving ergotocin in solution, on account of the differential solubility which we have discovered.

In carrying out the second step, we may proceed in alternative manners. One is to extract a solid ergot extract as produced by Step 1 with a dilute solution of one of the group of reagents of Step 2—0.1% to 0.3% solution in the case of silver salt or of the amino-R-salt. The other is to form a dilute water solution of the solid extract obtained by Step 1, and then to add to that dilute water solution a precipitating reagent of Step 2, in such amount as needed to produce the concentration necessary to precipitate the "known ergot alkaloids" while leaving ergotocin in solution—0.1% to 0.3% in the cases of silver salt and amino-R-salt.

In either way, after the ergot extract and the precipitating reagent of Step 2 have been brought together the liquid is suitably separated from the solid matter, as by filtration.

(This solid matter may be used as a source of "known ergot alkaloids" if desired.)

The filtrate so obtained is a crude solution of ergotocin. It is a somewhat colored solution, usually yellowish. Although it still contains a considerable amount of débris, more than is desired, and also after the removal of the excess of the precipitant reagent (such as silver salt) contains a trace of the "known ergot alkaloids", the important thing is that ergotocin usually constitutes about 50% to 60% of its total solids. Nevertheless, this crude extract is excellent for use, with or without removing the precipitant reagent, since it is effective on oral administration to human mothers in doses of 1.0 to 1.5 mg., and its effect is uniform and predeterminable. It is better than any known ergot extract of which we are aware; and better than any "known ergot alkaloid", as compared either on the basis of the oxytocic effect produced on oral administration by the amount obtained from a given quantity of defatted ergot or on the basis of the relation of the beneficial effect to other and undesirable physiological effects.

*Step 3*

The crude solution of ergotocin, which is obtained as a result of filtration after the second step, may be purified and concentrated; as by salting out if the second step was by one of the precipitant reagents under 2—a. This salting-out may itself be Step 2. It may be done as follows:

The hydrogen ion concentration of the filtrate (as of the second step) is again adjusted, if necessary, to a fairly acid point, advantageously about pH 2; as by the addition of a hydrochloric or sulphuric or phosphoric acid. To this acidified solution is then added sodium sulfate or ammonium sulfate or sodium chloride, to partial or complete saturation; about 50% saturation being a convenient and advantageous point if sodium chloride is the salting-out reagent. Indeed, if the ergotocin is in high concentration, it is desirable not to have too high a salt concentration, for under such conditions there is some loss of ergotocin in any precipitate which is formed. When the addition of the salting-out reagent produces a precipitate, as it sometimes does (practically always if the second step is merely salting out), this precipitate may be removed by filtration.

The remaining solution, which is an acidulated aqueous saline solution in character, may then (if desired) be extracted with chloroform, or first with ether and then separately with chloroform; and this chloroform extract, or these ether and chloroform extracts when both ether and chloroform are used, are rejected while the remaining acidulated saline solution is retained.

This acidulated saline solution contains a salt of the desired ergotocin; but the rejected chloroform extract, or chloroform and ether extracts, contain much of the débris, particularly the colored impurities. By keeping the hydrogen ion concentration as acid as pH 2 there is very little loss of ergotocin in these chloroform and ether extracts, although there is a small loss if the acidity is less.

This step of extracting the acidulated aqueous solution with chloroform, or with ether and then with chloroform, is not essential, but we regard it as advantageous.

Step 4

Whether or not the chloroform extraction of the acid solution is done, and whether or not salting out is done although we prefer that that be done, the solution is then adjusted, as with sodium carbonate or bicarbonate, or even with sodium hydroxide, to about pH 6.2 to pH 8.2, advantageously to about pH 7.2 to 7.4.

This pH-adjusted solution is then extracted with chloroform, and the ergotocin passes into the chloroform solution. At least from 3 to 4 extractions are necessary for a good yield, if chloroform alone is used.

In this step of extracting the pH-adjusted solution, it is not possible at this point to use ether or benzene or trichloroethylene instead of chloroform; for ether and benzene and trichloroethylene do not extract ergotocin in appreciable amounts from alkaline water solutions. This differentiates ergotocin sharply from the "known ergot alkaloids"; for ether or trichloroethylene extracts the "known ergot alkaloids" from alkaline water solutions containing them.

However, instead of chloroform we may use any of the solvents noted under the general statement of Step 4—butyl alcohol, isopropyl alcohol, cyclohexanol, methylnaphthalene, etc.— under the conditions there recited which either by reason of the character of such solvent or by reason of having the aqueous solution more or less nearly saturated with a salt, prevent mixing of the extracting solvent with the water.

To facilitate the extraction of ergotocin by the chloroform from the alkaline water solution, we prefer to add also a relatively small amount, say from 5% to 20% of the amount of chloroform used, of an aliphatic alcohol having not to exceed seven carbon atoms, such for instance as methyl alcohol or ethyl alcohol or cyclohexanol, etc. If an alcohol is used that mixes with fresh water, it is essential under these conditions that the aqueous solution be fairly well saturated with a salt to prevent such mixing.

Step 5

This chloroform solution of ergotocin, appropriately dried as with sodium sulfate, may be simply evaporated to dryness, desirably under vacuum, to obtain the free base ergotocin in solid form.

Since this base as such does not keep well, however, but turns brown in the air within a week or two, it is preferable to isolate ergotocin in the form of a salt; for the salts of ergotocin have excellent keeping qualities.

However, not all acids combine with ergotocin to yield salts which are readily obtainable in well-defined crystalline form. For instance, we find that many of the monocarboxylic acids tested by us, such as acetic acid, monochloracetic acid, propionic acid, butyric acid, lactic acid, benzoic acid, monochlorobenzoic acid, 2,4-dichlorobenzoic acid, paranitrobenzoic acid, phenyl-sulfonic acid, and others, do not give crystalline salts of ergotocin which can be readily isolated by the process we are about to describe. On the other hand, we find that dicarboxylic acids, particularly those of the aliphatic series, and singularly those which contain not more than five carbon atoms, give by that process crystalline salts of ergotocin which are quite stable and which can readily be crystallized from solvents. It is these dicarboxylic acids which make the isolation of ergotocin a relatively simple procedure.

Among the dicarboxylic acids, we find that those in which the primary ionization constant of the acid is somewhere between $10^{-2}$ to $10^{-4}$ are the best suited for this purpose.

There is even a rough relation between the primary ionization constant of the acid and its suitability for this purpose.

Maleic acid has a primary ionization constant of $1.5 \times 10^{-2}$, and is an excellent acid for our purpose. Oxalic acid has a primary ionization constant of $3.8 \times 10^{-2}$, and is also quite useful for our purpose. Malonic acid, which has a primary ionization constant of $1.6 \times 10^{-3}$, and malic acid, which has a primary ionization constant of $4 \times 10^{-4}$, are not so good as maleic and oxalic acids, but still satisfactory; while succinic acid, which has a primary ionization constant of $6.6 \times 10^{-5}$, is not particularly suitable for our purpose, although it is still better than any monocarboxylic acid of which we are aware.

We may prepare these ergotocin salts of such dicarboxylic acids from the dry chloroform solution as follows:

To the dry chloroform solution of ergotocin, or a solution of ergotocin in other appropriate solvent of the character indicated, there is added an ether solution of the desired acid; for instance maleic acid or oxalic acid. The ergotocin salts of these dicarboxylic acids are extremely insoluble in ether and in chloroform and mixtures thereof, so that the ergotocin salts of such acids usually separate at once. In some cases it is best, for complete precipitation, to add a fairly large volume of ether. For instance, if the base ergotocin is contained in ethyl alcohol or butyl alcohol, the procedure just outlined may be followed, but the precipitation of the ergotocin salt is facilitated by several volumes of ether.

The ergotocin salts of dicarboxylic acid which are thus obtained from chloroform or other solution by the addition thereto of an ether solution of the dicarboxylic acid, are suitably separated from the supernatant liquid, as by filtration. Such salts may be purified by recrystallization from suitable solvents, such for instance as ethyl alcohol, butyl alcohol, etc.

Similarly, the base ergotocin may be purified by recrystallization from suitable solvents, such for instance as chloroform, benzene, and dichloroethylene.

Examples:

The following are several examples showing our process:

Example 1

500 pounds of defatted ergot are extracted with liquid sulfur dioxide. The liquid extract so obtained is separated from the residue, and the liquid sulfur dioxide is allowed to evaporate; which leaves about twelve pounds of the solid sulfur-dioxide extract. This is very rich in ergotocin, although it also contains some "known ergot alkaloids".

This 12 pounds of solid sulfur-dioxide extract is dissolved in 5.7 liters of 99% ethyl alcohol, and the solution so obtained is poured into 25 gallons of distilled water containing 114 grams of silver salt. This makes the solvent an aqueous one of about 5% (it is advantageously between 2% and 5%) alcohol concentration and 0.1% silver salt concentration. The whole is now stirred for about 3½ hours, and then filtered.

To the filtrate so obtained is added 35 pounds of sodium chloride. This is stirred well, and then the whole is filtered, and the filtrate retained while the precipitate may be discarded. (This precipitate, as well as the one obtained just ahead of it, may be retained if desired, for use as a source of "known ergot alkaloids".)

To this latter filtrate is now added 1.5 pounds of sodium bicarbonate. The solution which has thus been alkalinized by the addition of sodium bicarbonate is extracted with a mixture of four gallons of chloroform and one gallon of ethyl alcohol, the whole being stirred for about 45 minutes to ensure good extraction. The chloroform and the water are allowed to separate, and the chloroform with its contained solute is separated from the water, as by a separatory funnel. The remaining water solution may be extracted again with chloroform, or several times again if desired; each time with vigorous stirring. In the second extraction about 2.5 gallons of chloroform are used; and in the third about two gallons. Each chloroform extract, whether one or several, is dried separately by adding sodium sulfate, in known manner; and then the chloroform extracts may be combined.

To the chloroform extracts is added an equal volume of ether containing 10 grams of maleic acid. This causes a precipitate of ergotocin maleate; which is separated from the supernatant fluid, as by filtration. The yield of ergotocin maleate is about 13.5 g.

The ergotocin maleate thus obtained is purified by recrystallization from ethyl alcohol if desired.

Example 2

500 pounds of defatted ergot are extracted with 300 to 350 gallons of 95% alcohol. The alcohol extract is separated from the residue; and then evaporated in vacuo to about 5.7 liters. This 5.7 liters of alcoholic solution is poured into 25 gallons of distilled water containing 114 grams of silver salt, in a manner described in Example 1, and from this point the procedure of Example 1 is continued.

Example 3

In the procedure of either Example 1 or Example 2, instead of using chloroform to make the extraction, we may use from four to eight gallons of butyl alcohol; but otherwise the procedure is the same.

In these examples, we have given certain preferred procedures, but they may be varied widely, as by the use of other reagents, as set forth in the earlier part of this specification.

Properties of the base ergotocin and its salts

The base ergotocin, when purified by recrystallization, melts sharply at about 158° C., with decomposition. It is somewhat soluble in water, and imparts thereto a slightly alkaline reaction to litmus.

Ergotocin combines with picric acid in alcohol solution to form an ergotocin picrate; which decomposes and melts at 195° to 197° C.

Ergotocin is a well defined crystalline material, which appears in the form of needles when crystallized from benzene.

Ergotocin and its salts in acid solution are not precipitated by the ordinary alkaloidal reagents when present in a concentration of less than one part in six thousand. So when tested with Mayers' reagent it does not give a precipitate unless the concentration is greater than that; as distinguished from the "known ergot alkaloids", which with Mayers' reagent give a precipitate in a concentration of about one part in a million.

The molecular weight of the base ergotocin is between 350 and 410, as determined by an electrometric titration of the base with an acid and by analyses of different salts of ergotocin obtained by crystallization from alcohol. For information now available indicates that this molecular weight is about 369; which includes one molecule of alcohol of crystallization, due to the fact that the material was crystallized from alcohol, so that the molecular weight of the true alcohol-free base seems to be in the neighborhood of 323.

The ergotocin salts of the dicarboxylic acids are well-defined crystalline substances, but apparently have no definite melting point. Upon heating they turn black, and melt somewhat at a temperature varying from 165° to 178° C. and then merely decompose with the evolution of a gas as indicated by puffing up of the material in a melting-point tube but they do not completely melt even though the temperature is raised to 190° C. or so.

These ergotocin salts of the dicarboxylic acids are all onium salts of quinquevalent nitrogen. They are freely soluble in water, and the solutions are colorless; but with an exceedingly pale blue fluorescence, particularly noticeable at the meniscus, when in higher concentration, as of the order of 0.5 mg. per cc. or greater. These salts are highly suitable for obtaining ergotocin in pure form, for they can be crystallized very readily from ethyl alcohol or butyl alcohol. The addition of an alkali to a solution of the ergotocin salt, followed by extraction with chloroform, enables one to obtain the free base in very pure condition.

In addition to the organic salts of ergotocin, of the dicarboxylic acids, we may obtain also an ergotocin salt of an inorganic acid. For instance, we may obtain ergotocin phosphate, by adding an ether solution of phosphoric acid to the chloroform or other solution of the base ergotocin. This ergotocin phosphate is very freely soluble in water, and it is not as definitely crystalline as the organic salts but tends to be amorphous. It has no definite melting point, but decomposes upon heating.

When any of the "known ergot alkaloids" or their salts are heated for from 3 to 4 minutes with sodium hydroxide, one molecule of ammonia is split off quantitatively. In contrast, when ergotocin or its salts are similarly heated with sodium hydroxide, there is at most only a faint trace of ammonia, and sometimes not even that.

Ergotocin and its salts when administered orally to human mothers induce strong uterine contractions. The effective oral dose of either ergotocin or its salts for a human mother is from 0.3 to 0.5 mg. When orally administered in such doses the uterine contractions usually start within from 4 to 8 minutes after such administration. The uterine motility which is initiated persists for from 2 to 4 hours. It is characterized by marked and persistent uterine tone, and frequent uterine contractions. During the first 15 to 20 minutes of its action there is marked tetany.

This is in strong contradistinction to the effects of even the so-called active members of the "known ergot alkaloids". The alkaloids ergotoxine, ergotamine, sensibamine are uniformly ineffective when administered orally to human mothers in doses of 2.0 mg. Even in larger doses, of 3.0 or 4.0 mg., they do not uniformly induce uterine activity. In still larger oral doses, of from 6.0 to 9.0 mg., the so-called active members of the "known ergot alkaloids" do produce uterine activity; but such doses, and even doses of 3.0 or 4.0 mg., are dangerous, because of their toxic effects on the patient.

Ergotocin and its salts are also effective when administered parenterally—subcutaneously, intramuscularly, or intravenously. The effect on intravenous administration is particularly striking. The effective dose for intravenous administration is 0.1 to 0.2 mg.; and powerful uterine contractions are usually produced within less than a minute, usually from 10 to 20 seconds, following the injection.

An outstanding feature of ergotocin and its salts on intravenous injection is that the material does not cause any toxic symptoms, any change in the blood pressure, any nausea or cyanosis, any gastrointestinal upsets, or any of the other grave symptoms that have been recorded in the literature following the intravenous injection of ergotamine tartrate or ergotoxine ethanesulfonate. Ergotocin in that respect is a unique pharmacological principle, in that it seems to act specifically on the uterine muscles. The toxicity of ergotocin to mice and rats is of the order of 250 mg. per kg. of body weight.

We claim as our invention:

1. The process of obtaining an ergot derivative which on oral administration in doses of a magnitude in which ergotoxine and ergotamine are substantially ineffective induces marked contractions in the postpartum human uterus, which consists in subjecting an ergot extract containing both said desired ergot derivative and "known ergot alkaloids" to the action of silver salt in solution in such concentration that "known ergot alkaloids" are caused to be in solid form while the desired ergot derivative is caused to be in solution, and separating such solution from the solids and retaining it.

2. The process as set forth in claim 1, with the addition of treating said solution at a hydrogen ion concentration not more acid than pH—6.2 with a solvent which is immiscible with the solvent of said solution but in which said desired ergot derivative is more soluble than it is in the solvent of said solution, separating the added solvent with the solute which it has taken up from the solvent of the former solution, and saving said added solvent with its contained solute.

3. The process as set forth in claim 1, with the addition of treating said solution at a hydrogen ion concentration not more acid than pH—6.2 with a solvent which is immiscible with the solvent of said solution but in which said desired ergot derivative is more soluble than it is in the solvent of said solution, separating the added solvent with the solute which it has taken up from the solvent of the former solution, saving said added solvent with its contained solute, and treating said last-named solution with an ether solution of an acid which combines with said desired ergot derivative to form a salt which is insoluble in said mixture.

4. The process as set forth in claim 1, with the addition that said solution is adjusted to an alkaline hydrogen ion concentration and extracted with chloroform, and the chloroform extract treated with an acid which precipitates from it a salt of the desired ergot derivative.

5. The process as set forth in claim 1, with the addition that said solution is made highly saline and somewhat alkaline and extracted with chloroform, and the chloroform extract so obtained treated with an acid which causes the precipitation of a salt of the desired ergot derivative.

6. The process of obtaining an ergot derivative from ergot, which consists in extracting defatted ergot with liquid sulphur dioxide, separating the extract from the residue and retaining the extract, allowing the sulphur dioxide to evaporate, treating the resultant residue with enough alcohol to substantially dissolve it, adding enough 0.1% solution of silver salt in water to produce a solution of 2% to 5% alcohol concentration, separating the precipitate from the liquid and retaining the liquid, making the liquid slightly alkaline, extracting the alkaline solution with chloroform and retaining the chloroform solution, and separating the desired ergot derivative from the chloroform.

7. The process of obtaining an ergot derivative from ergot, which consists in extracting defatted ergot with liquid sulphur dioxide, separating the extract from the residue and retaining the extract, allowing the sulphur dioxide to evaporate, treating the resultant residue with enough alcohol to substantially dissolve it, adding enough 0.1% solution of silver salt in water to produce a solution of 2% to 5% alcohol concentration, separating the precipitate from the liquid and retaining the liquid, making the liquid highly saline and slightly alkaline, extracting the alkaline solution with chloroform and retaining the chloroform solution, and separating the desired ergot derivative from the chloroform.

8. The process of obtaining an ergot derivative from ergot, which consists in extracting defatted ergot with liquid sulphur dioxide, separating the extract from the residue and retaining the extract, allowing the sulphur dioxide to evaporate, treating the resultant residue with enough alcohol to substantially dissolve it, adding enough 0.1% solution of silver salt in water to produce a solution of 2% to 5% alcohol concentration, separating the precipitate from the liquid and retaining the liquid, making the liquid slightly alkaline, extracting the alkaline solution with chloroform and retaining the chloroform solution, and evaporating the chloroform from the chloroform extract.

9. The process of obtaining an ergot derivative from ergot, which consists in extracting defatted ergot with liquid sulphur dioxide, separating the extract from the residue and retaining the extract, allowing the sulphur dioxide to evaporate, treating the resultant residue with enough alcohol to substantially dissolve it, adding enough 0.1% solution of silver salt in water to produce a solution of 2% to 5% alcohol concentration, separating the precipitate from the liquid and retaining the liquid, making the liquid slightly alkaline, extracting the alkaline solution with chloroform and retaining the chloroform solution, and treating the chloroform solution with an ether solution of a dicarboxylic acid to precipitate a salt of the desired ergot derivative.

10. The process of obtaining an ergot derivative from ergot, which consists in extracting defatted ergot with liquid sulphur dioxide, separating the extract from the residue and retaining the extract, allowing the sulphur dioxide to evaporate, treating the resultant residue with enough alcohol to substantially dissolve it, adding enough 0.1% solution of silver salt in water to produce a solution of 2% to 5% alcohol concentration, separating the precipitate from the liquid and retaining the liquid, making the liquid slightly alkaline, extracting the alkaline solution with chloroform and retaining the chloroform solution, and treating the chloroform solution with an ether solution of maleic acid to precipitate the maleate of the desired ergot derivative.

11. A pure crystalline compound derived from ergot and free from the known ergot alkaloids, which substance on oral administration in doses of about 0.3 to 0.5 mg. and on intravenous administration in doses of about 0.1 mg. rapidly induces powerful rhythmic contractions in the postpartum human uterus but in therapeutically effective doses usually produces substantially no effect on the blood pressure, on being heated with sodium hydroxide yields not more than a faint trace of ammonia, is not precipitated by Mayers' reagent when present in a concentration of less than one part in 6000, is extractable by chloroform from dilute water solutions adjusted to an alkaline reaction, and when in base form has a melting point of about 158° C.

12. A pure, solid, water soluble ergot derived compound, free from the known ergot alkaloids, which in the form of its free base is alkaline in reaction and capable of forming salts, and which is effective upon oral administration in doses of the order of 0.5 mg. in producing a prompt, intense and prolonged oxytocic effect in puerperal human mothers.

MORRIS S. KHARASCH.
ROMEO RALPH LEGAULT.

CERTIFICATE OF CORRECTION.

Patent No. 2,156,242. April 25, 1939.

MORRIS S. KHARASCH, ET AL.

It is hereby certified that error appears in the printed specification of the above numbered patent requiring correction as follows: Page 2, second column, line 37, for "November 19, 1936" read November 18, 1936; page 5, first column, line 32, for "99%" read 95%; same page, second column, line 49, for the word "For" read The; and that the said Letters Patent should be read with this correction therein that the same may conform to the record of the case in the Patent Office.

Signed and sealed this 11th day of July, A.D. 1939.

(Seal)

Henry Van Arsdale
Acting Commissioner of Patents.